United States Patent
Baxter

[11] 3,759,483
[45] Sept. 18, 1973

[54] FLUID ACTUATED CONTROL VALVE

[76] Inventor: Thomas D. Baxter, 946 Salisbury Ct., Lancaster, Pa. 17604

[22] Filed: May 14, 1971

[21] Appl. No.: 143,468

[52] U.S. Cl.......................... 251/5, 251/7, 251/251
[51] Int. Cl............................................... F16k 7/06
[58] Field of Search............................251/4–10

[56] References Cited
UNITED STATES PATENTS

| | | | |
|---|---|---|---|
| 143,907 | 10/1873 | Hyde | 251/7 |
| 722,322 | 3/1903 | Palm | 251/251 |
| 2,371,434 | 3/1945 | Eppler | 251/7 X |
| 2,467,150 | 4/1949 | Nordell | 251/5 X |
| 2,841,358 | 7/1958 | Russell et al. | 251/8 |

Primary Examiner—Martin P. Schwadron
Assistant Examiner—Richard Gerard
Attorney—Le Blanc & Shur

[57] ABSTRACT

The valve includes a housing carrying a flexible fluid conduit forming a part of a fluid line. Valve closure members lie on opposite sides of the flexible conduit. One closure member is fixed and normally engages the conduit flexing it inwardly short of its central axis. The other closure member is mounted for sliding movement toward and away from the fixed member. A cam is carried by the housing for reciprocating movement, a roller being carried by the movable valve closure member in engagement with the cam. A fluid control cylinder selectively reciprocates the cam. In one cam position, the flexible fluid conduit is open. In moving from the one to a second cam position under control of the fluid cylinder, the movable closure member slides toward the fixed closure member to pinch the walls of the flexible conduit together and against the fixed closure member thereby closing the valve. The cam includes a flat which engages the roller on the movable closure member to maintain the valve closed notwithstanding failure of the pressure fluid in the fluid control cylinder. In one form, the flexible conduit includes diametrically opposed inwardly projecting seats having arcuate surfaces. The movable closure member has like surfaces. The surfaces are configured to preclude fatigue or failure of the conduit.

1 Claim, 10 Drawing Figures

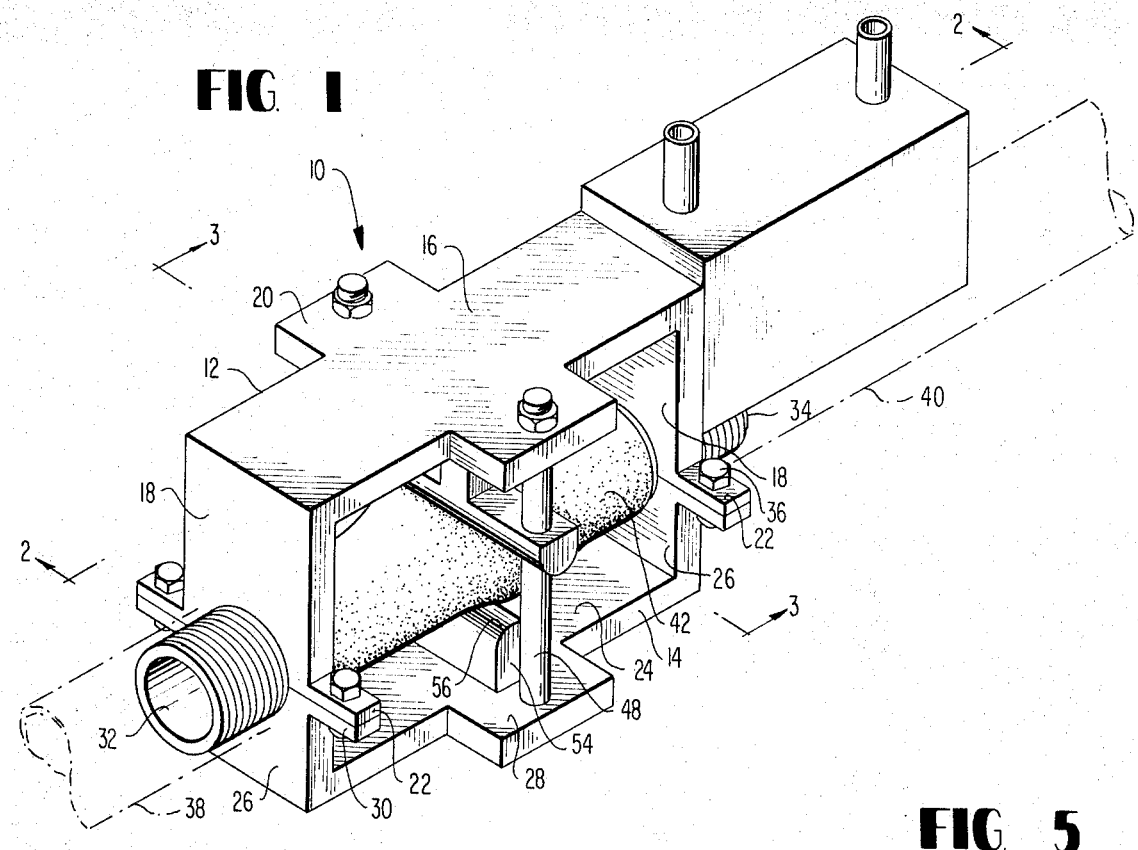
FIG. 1
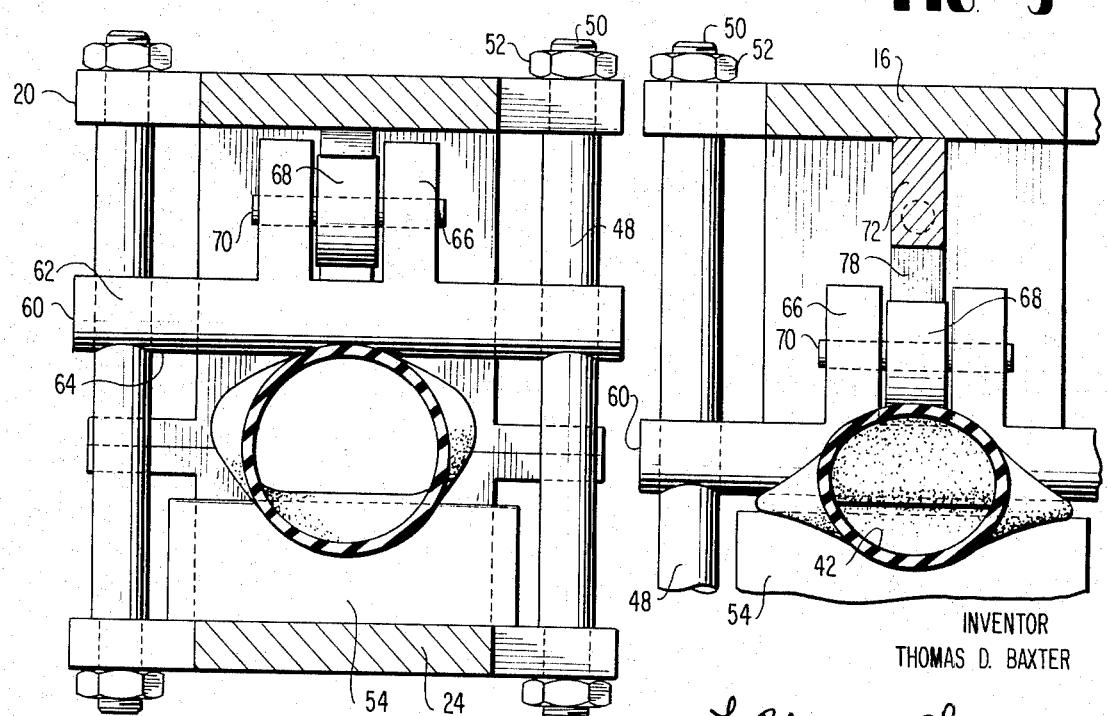
FIG. 3
FIG. 5
INVENTOR
THOMAS D. BAXTER
BY Le Blanc & Shur
ATTORNEYS

FLUID ACTUATED CONTROL VALVE

The present invention relates to a valve for a fluid line and particularly relates to a fluid actuated control valve of the type which pinches a flexible tubing forming a portion of a fluid line in order to close the valve. The present invention also relates to a valve of the foregoing type which is operable to remain in a valve closed position notwithstanding failure of the fluid control system for the valve. This invention further relates to a novel flexible conduit and closure member therefor configured to eliminate and/or reduce problems associated with flexural failure of the conduit.

Fluid valves of the type wherein a flexible conduit is pinched to close or vary the area of a passage therethrough are known in the prior art. For example, in U.S. Pat. No. 3,515,170, there is disclosed a valve comprised of a flexible fluid conduit with discs on opposite sides thereof, one of the discs being movable toward the other disc. A cylinder plug is suitably grooved to force a spherical bead against the movable disc in response to rotation of the plug thereby to move the disc toward the other disc and pinch the walls of the conduit together to block fluid passage therethrough. Another valve of the foregoing type is disclosed in U.S. Pat. No. 3,071,347. In that patent, an inclined camming surface cooperates with a roller to vary the area of a flexible conduit in response to movement of the camming surface.

While those valves are presumably satisfactory for their intended purpose, it has been found, particularly in those valves utilizing inclined camming surfaces, that the valve normally opens in response to removal of the force effecting the camming action, the latter camming action, of course, maintaining the valve closed. For example, where pinch type cam operated valves are fluid actuated, the pressure in the fluid line through the valve normally tends to open the valve in response to a failure in the fluid control system for the valve.

It has also been found that the flexible conduit fatigues and fails after continuous use. This failure occurs along the axis of the conduit at right angles to the flow of fluid therethrough and at the portions of the conduit subjected to the greatest degree of flexure. Repeated applications to and removal of pressure from the conduit to effect the pressure seal creates tensions along the opposite side walls. This area of the conduit is, of course, subjected to the greatest degree of flexure, oftentimes resulting in fatigue and rupture. Obviously, a rupture of the conduit in any application of the valve results in discontinuity of the flow through the conduit and is to be avoided.

The present invention eliminates and/or minimizes the above discussed and other problems associated with prior valves of this type and provides a novel and improved fluid actuated control valve and flexible conduit therefor having various advantages in construction, mode of operation and use in comparison with such prior valves. Particularly, it has been found desirable to provide a pinch-type valve under the control of a fluid system wherein the valve will remain in a closed condition notwithstanding failure of the fluid control system. Also, it is important to minimize and/or eliminate problems associated with flexural failure of the conduit.

To accomplish the foregoing, the present invention provides a pinch-type fluid actuated control valve including an open housing in which is mounted at opposite ends a pair of rigid sleeves connected one to the other by a flexible conduit. The housing includes a pair of valve closure members on opposite sides of the flexible conduit, one of the valve closure members being movable toward and away from the other member which is preferably fixed to the housing. The fixed valve closure member extends toward the centerline of the flexible conduit for a distance short thereof but sufficiently to normally and limitedly flex the conduit. The other closure member is mounted for slideable movement toward and away from the fixed member by means of a cam mounted for reciprocating movement under the control of a fluid actuated cylinder. The cam includes a cam surface engageable with a roller carried by the movable closure member. In a first position of the camming surface corresponding to a valve open position, the valve closure member is spaced a substantial distance from the fixed closure member. When the fluid cylinder is actuated to shift the cam into a second position corresponding to a valve closed position, the movable closure member slides toward the fixed member and pinches the walls of the flexible conduit against one another and against the fixed closure member thereby closing the passage through the conduit.

The cam surface includes a flat which extends normal to the direction of movement of the movable closure member and engages the roller in the valve closed position. In the event of failure of the fluid control system, the tendency of the walls of the flexible conduit to separate under the pressure of the fluid flowing through the flexible conduit or any natural tendency of the conduit to obtain its natural circular shape are precluded as the movable closure member cannot then slide from its valve closed position. Upon retraction of the cam to its initial position, the latter forces move the movable closure member to a valve open position.

The present invention also includes a uniquely configured flexible conduit and closure apparatus therefor whereby problems of fatigue and failure associated with prior flexible conduits are minimized and/or eliminated. Particularly, the present invention includes a pair of diametrically opposed inwardly projecting valve seats having arcuate sealing surfaces. The seats project diametrically toward one another, their tips being spaced one from the other. Fixed and movable closure members are disposed on diametrically opposite sides of the conduit with the seats located therebetween. The closure members have surfaces conforming to the arcuate surfaces on the seats. To seal the conduit, the closure members press the walls of the conduit about the seats at opposite sides of the conduit with intermediate conduit wall portions being pressed against one another to effect the seal. The seats limit the flexure required at the sides of the conduit where the greatest fatigue and the most likelihood of failure occurs. The walls of the conduit thus bear against one another and against the seats to form a continuous seal across the conduit. The arcuate surfaces provided the seats and the closure members are specifically configured to minimize and/or preclude flexural failure of the conduit.

Accordingly, it is a primary object of the present invention to provide a novel and improved fluid actuated control valve.

It is another object of the present invention to provide a novel and improved valve operable to pinch a flexible conduit to close the passage therethrough and which valve is under the control of a fluid actuated cylinder.

It is still another object of the present invention to provide a novel and improved fluid actuated control valve having the foregoing characteristics wherein the fluid flow through the flexible conduit and/or the natural tendency of the flexible conduit to obtain its natural circular shape cannot open the valve notwithstanding failure in the fluid control system for the valve.

It is a related object of the present invention to provide a novel flexible conduit and closure therefor in which the likelihood of conduit failure due to flexural stresses is minimized.

It is a further object of the present invention to provide a novel and improved fluid actuated control valve having the foregoing characteristics and which is constructed of a minimum number of parts, readily and easily assembled and which can be provided at minimum cost.

These and further objects and advantages of the present invention will become more apparent upon reference to the following specification, appended claims and drawings, wherein:

FIG. 1 is a perspective view of a fluid valve constructed in accordance with the present invention;

FIG. 3 is a cross sectional view thereof taken generally about on line 3—3 in FIG. 1;

FIG. 5 is a fragmentary cross sectional view thereof similar to FIG. 3 illustrating the valve in a valve closed position;

Figure 2:
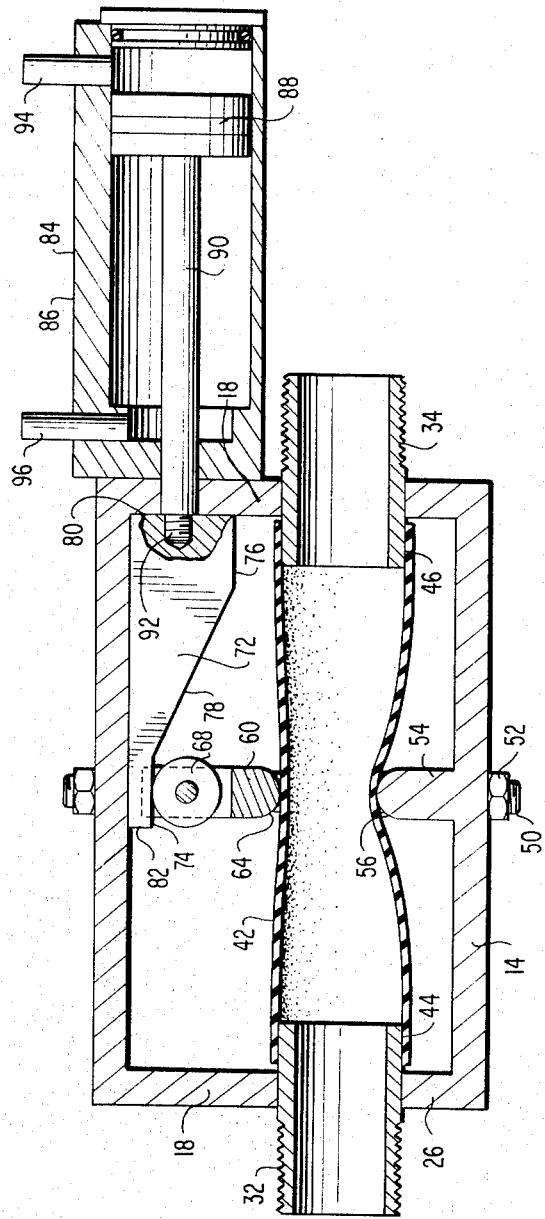
FIG. 2 is a cross sectional view thereof taken generally about on line 2—2 in FIG. 1 illustrating the valve in an open position.

Referring now to the drawings, particularly to FIG. 1, there is illustrated in a fluid valve, generally indicated 10, comprising a housing 11 including a pair of generally U-shaped oppositely disposed mounting plates 12 and 14. Plate 12 has a base portion 16, opposite end walls or legs 18, laterally extending flanges 20 intermediate the ends of base portion 16, and tabs 22 which extend laterally from the side edges of walls 18 adjacent the ends thereof. Plate 14 similarly has a base portion 24, opposite end walls or legs 26 which are reduced in length in comparison with end walls 18 of plate 12, and similar laterally extending flanges 28 and tabs 30. End walls 18 and 26 are each provided with semicircular cutouts which, when the plates 12 and 14 are secured together as illustrated, cooperate one with the other at opposite ends of housing 11 to form longitudinally registering circular openings for receiving sleeves 32 and 34.

To form housing 11, plates 12 and 14 are arranged opposite one another and bolts 36 are received through suitable registering openings formed in tabs 22 and 30 and threadedly engage nuts therefor, not shown. Sleeves 32 and 34 are also located in the semicircular cutouts in the end walls 18 and 26 at opposite ends of the housing and are clamped therebetween when the plates 12 and 14 are finally secured one to the other. The ends of sleeves 32 and 34, which project outwardly of housing 11, are threaded for engagement with suitable pipe sections 38 and 40. A flexible conduit 42, formed of a plastic, rubber of other like flexible material, is received over and suitably secured to the smooth bore inner ends 44 And 46 of sleeves 32 and 34 respectively. It will be appreciated that the sleeves 32 and 34 and flexible conduit 42 form a portion of a fluid line through valve 10 and which line includes pipe sections 38 and 40.

Also, a pair of guide bars 48 interconnect plates 12 and 14 along opposite sides of housing 11. Particularly, flanges 20 and 28 are provided with suitable openings in which are received the reduced diameter threaded opposite end portions 50 of the guide bars 48. Nuts 52 thread down on end portions 50 to secure Guide bars 48 in place.

A valve closure member 54, preferably formed integrally with plate 14, projects inwardly from base portion 24 toward the opposite plate 12 a distance sufficient to engage flexible conduit 42. Valve closure member 54 thus normally slightly enlarges conduit 42 in a lateral direction and reduces its depth in the vertical direction in the valve open position. This substantially eliminates any need for stretching conduit 42 when the walls thereof are pinched in the valve closed position as will be described presently. Valve closure member 54, however, extends toward plate 12 short of the coincident axes of sleeves 32 and 34 and conduit 42. Valve closure member 54 also extends between guide bars 48 and has an upper edge 56 which is convex, preferably semicircular, throughout its lateral extent as illustrated in FIG. 2.

Figure 4:
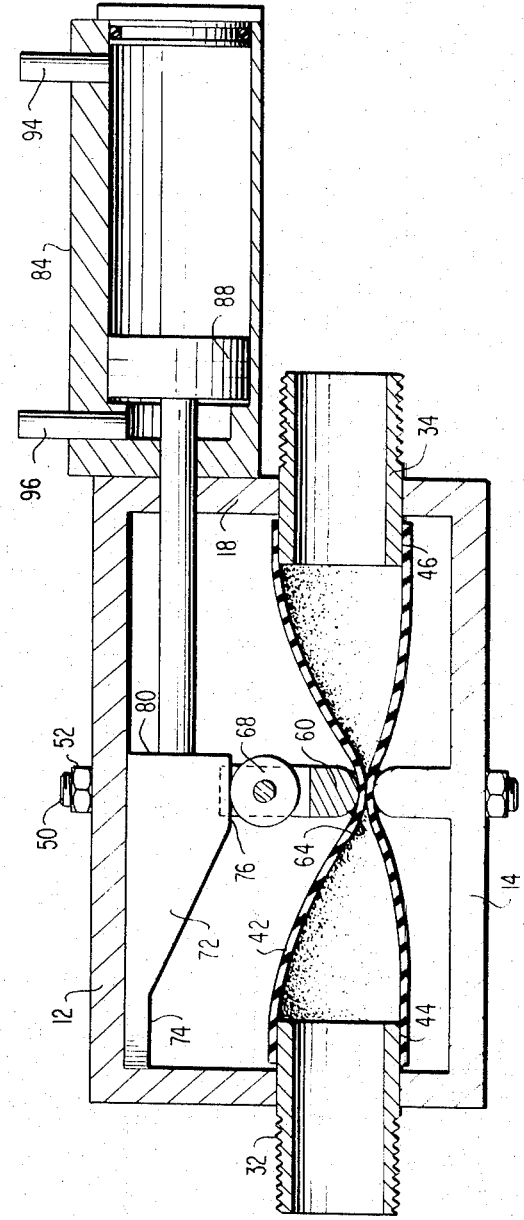
FIG. 4 is a cross sectional view thereof similar to FIG. 2 illustrating the valve closed position.

On the opposite side of flexible conduit 42, there is provided a movable valve closure member 60 comprised of an elongated bar 62. The lower edge 64 of bar 62 is convex, preferably semicircular, throughout its lateral extent as illustrated in FIGS. 2–4. Opposite ends of bar 62 are provided with suitable bores whereupon closure member 60 is slideably mounted on bars 48 for movement toward and away from flexible conduit 42 and fixed closure member 54. A pair of lugs (FIG. 3) upstand from a central portion of bar 62 and carry a roller 68 therebetween on a pin 70 journalled in lugs 66.

A generally triangularly shaped camming plate or element 72, slidable lengthwise relative to housing 11, carries a plurality of cam surfaces along its lower edge. Particularly, the cam surfaces comprise flats 74 and 76 at opposite ends of the lower edge of element 72 and an intermediate inclined surface 78 extends between flats 74 and 76. The flats 74 and 76, as illustrated in FIG. 2, are accordingly at different elevations along element 72. In the valve open position illustrated in FIG. 2, flat 74 engages roller 68, while in the valve closed position illustrated in FIG. 4, flat 76 engages roller 68. The length of element 72 is such that its end edge 80 in the valve open position butts one end wall 18 of plate 12 and, in the valve closed position, its opposite end edge 82 butts the opposite end wall 18 of plate 12. The end edges 80 and 82 provide stops limiting the movement of cam element 72.

A fluid control cylinder 84 for controlling valve 10 is provided and comprises a cylinder 86 having a piston 88 including a piston rod 90 which extends through one end of cylinder 86 and through an opening formed in end wall 18 of plate 12 for threaded engagement as at 92 with camming element 72. Ports 94 and 96 are provided at opposite ends of cylinder 84 for ingress and egress of fluid for reciprocating piston 88 and element 72. Ports 94 and 96 are connected to a source of fluid under pressure and, through suitable valving, pressure fluid is selectively provided either port 94 or 96 with the other port open to exhaust, the source of pressure fluid and valving not being shown. It will be appreciated that the lower edge of element 72 is disposed between lugs 66 and that the latter form a guide for element 72 throughout the full length of its movement as illustrated in FIG. 3.

In use, the natural tendency of the flexible conduit 42 to retain its generally circular shape, particularly under the pressure of the fluid flowing through the fluid line, maintains valve closure member 60 in a normally valve open position as illustrated in FIG. 2, roller 68 engaging along flat 74 at one end of cam element 72. To close the valve, fluid under pressure is provided inlet port 94 to advance piston 88 toward the opposite end of cylinder 84 thereby moving cam element 72 toward the opposite end of housing 11. In traversing from one end of housing 11 to the other, the inclined surface 78 of cam element 72 engages roller 68 and slides valve closure member 60 toward fixed valve closure member 54. More particularly, as best illustrated in FIGS. 4 and 5, closure member 60 presses the upper side of the flexible conduit 14 across the common axes of sleeves 32 and 34 and flexible conduit 42 to pinch the side walls of conduit 42 against one another and against the fixed closure member 54 thereby closing valve 10. As illustrated in FIG. 4, element 72 slides toward the opposed end of housing 11 until edge 82 thereof butts end wall 18 at which time flat 76 lies in engagement with roller 68 in a position maintaining the valve fully closed. To open the valve, fluid under pressure is admitted through port 96 to move the piston 88 to the right as illustrated in FIG. 4, moving element 72 back to its original position illustrated in FIG. 2. The tendency of the flexible conduit 42 to maintain its generaly circular cross sectional configuration in conjunction with the pressure of the fluid flowing through the conduit which also tends to expand the flexible conduit to its full generally circular cross sectional configuration slides valve closure member 60 along guides 48 back to the position illustrated in FIG. 2, the roller 68 rolling from flat 76 along inclined surface 78 and engaging flat 74 in the valve open condition.

It is a feature of the present invention that, in the valve closed position, the cam element 72 cooperates with the movable valve closure member 60 to maintain the valve closed notwithstanding failure of the fluid supply for control valve 84. That is to say, should the fluid pressure on opposite sides of piston 88 become equalized or should the pressure maintaining the piston in the position illustrated in FIG. 4 fail, the force applied to the movable valve closure member 60 by the natural tendency of the conduit to obtain its circular configuration and/or the pressure of the fluid flowing therethrough, acts in a direction normal to the plane containing flat 76. Thus, in the event of failure of the fluid supply for control valve 84, cam element 72 remains in the valve closed position as there is no force tending to move it longitudinally of housing 11.

The foregoing described embodiment of the present invention has been described with respect to a wholly circular flexible conduit. It will, however, be appreciated that the lateral edges of the conduit, indicated 80 in FIG. 5, are subjected to severe flexural stresses when the conduit material in those areas is required to bend over upon itself a full 180° to effect the seal. Continuous flexing of the conduit at this point to selectively open and close the valve, results in eventual failure or rupture of the conduit material at that point. To preclude such rupture of failure, to prolong the life of the flexible conduit employed in a pinch type valve, and to improve the pinch valve seal, the present invention provides a novel flexible conduit and valve closure members therefor which will now be described with respect to the embodiment hereof illustrated in FIGS. 6–10.

Figure 6:
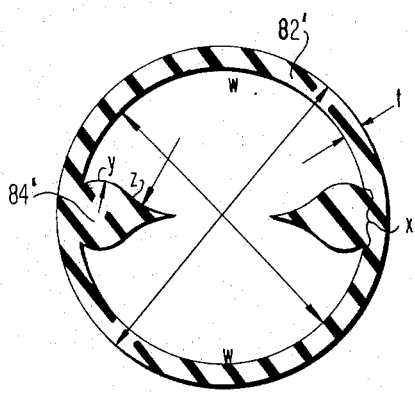
FIG. 6 is a transverse cross sectional view through a novel flexible conduit constructed in accordance with the present invention and which conduit forms a part of the valve hereof.
Figure 8:
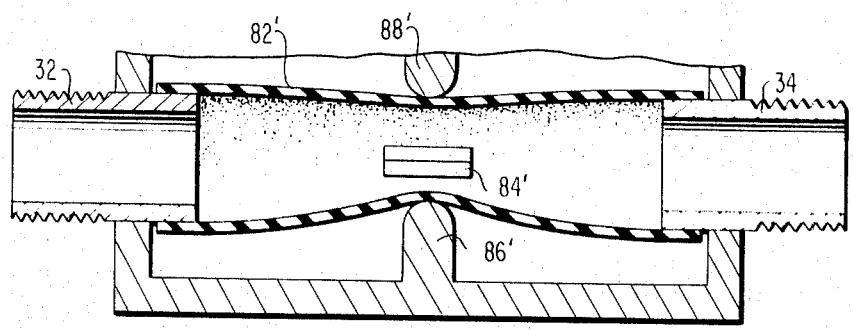
FIG. 8 is a fragmentary cross sectional view illustrating the conduit illustrated in FIGS. 6 and 7 in the environment of the valve hereof.
Figure 9:
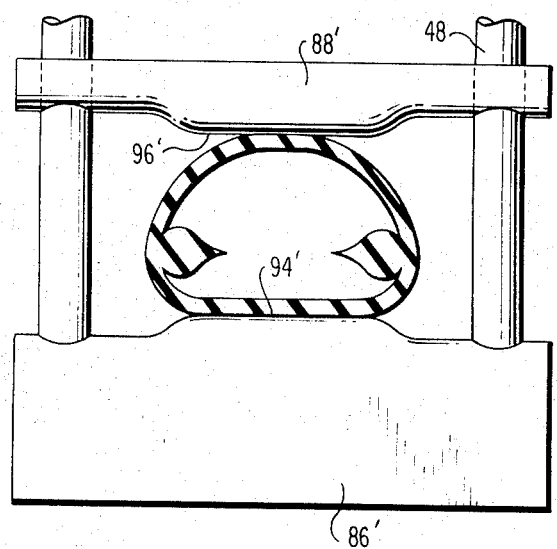
FIGS. 9 and 10 are fragmentary transverse cross sectional views of the pinch valve hereof illustrating the novel conduit therefor in valve open and closed positions, respectively.

Referring particularly to FIG. 6, there is disclosed a flexible, generally circular, conduit 82' having a pair of inwardly projecting diametrically opposed valve seats 84'. As illustrated in FIG. 8, seats 84' are disposed intermediate the ends of conduit 82' and in a plane containing the fixed and movable closure members 86' and 88' respectively. But for the conduit 82' and the fixed and movable closure members 86' and 88', the valve structure in this embodiment is identical to the valve structure in the previous embodiment.

The arcuate surfaces $y$ and $z$ on opposite sides of each of the seats 84' are specifically configured in accordance with the diameter of the flexible conduit and its wall thickness $t$ to reduce and/or eliminate problems associated with fatigue and failure along the side walls of the conduit subjected to the highest degree of flexure. That is to say, with the foregoing arcuate surfaces, the flexural stresses produced along the sides of the conduit wherein the walls of the conduit must bend back onto themselves are minimized and sharp bends in the wall are eliminated. To determine the optimum arc distances of surfaces $y$ and $z$, the arc distance $w$ between seats 84', and the arc distance $x$ of the base portions of seats 84' along the inside diameter of the conduit, the following formulae are employed:

$$x = 3.1417 \times (0.25 \text{ O.D.} - 0.175 \text{ I.D.} - t) \quad (7)$$

$$y = 3.1417 \times [0.25 (0.25 \text{ O.D.} - 0.175 \text{ I.D.} - t)] \quad (7)$$

$$z = 3.1417 \times \frac{[0.25 (0.25 \text{ O.D.} - 0.175 \text{ I.D.} + t)]}{2} \quad (6)$$

$$w = 1.5708 \times \text{I.D.} - 3.1417 \times (0.25 \text{ O.D.} - 0.175 \text{ I.D.} \; t) \quad (8)$$

where O.D. and I.D. represent the outside to inside diameter of the conduit 82' respectively and $t$ represents the conduit wall thickness.

The foregoing formulae are based upon a 30 percent safety factor decreasing the distance L, signifying the wall to wall contact, to a value of 1.1 I.D. [The wall contact without seats 84' is 1.5708 I.D. and hence with the safety factor is (1.7 × 1.5708 I.D.) or 1.1. I.D.] By forming the surfaces $y$ and $z$ in accordance with the foregoing formulae and locating and configuring the seats as indicated, the flexural stresses at the sides of the conduit are minimized.

Figure 7:
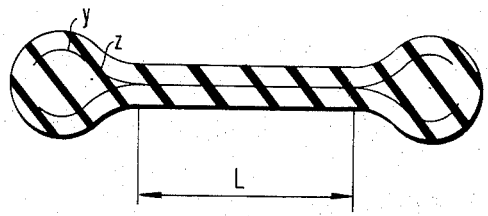
FIG. 7 is a view similar to FIG. 6 illustrating the conduit in a valve closed position.
Figure 10:
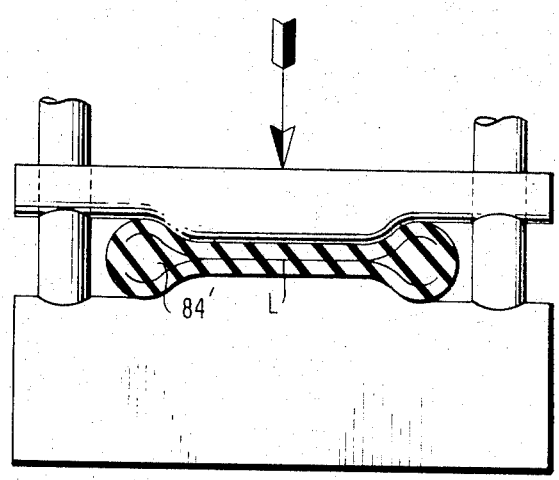

The fixed and movable closure members 86' and 88' have conduit engaging surfaces 94' and 96', respectively, formed to complement the external shape of the conduit when the opposite walls are pressed one against the other and against the seats 84' as illustrated in FIGS. 7 and 10. As will be appreciated, the closure members thus press the walls of the conduit against the seats and against one another along the line L, indicated in FIGS. 7 and 10, effectively sealing the passage through conduit 82' while simultaneously minimizing the flexural stresses applied thereto.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

1. A valve for selectively opening and closing a passage through a flexible conduit comprising a pair of closure members on opposite sides of the flexible conduit, at least one of said closure members being movable toward and away from the other of said closure members to obtain valve closed and valve opened positions respectively, said closure members being elongated and having generally convex opposing edges extending substantially their full length, said conduit having a pair of valve seats projecting inwardly toward one another on generally diametrically opposite sides of said conduit, said valve seats having arcuate surfaces on each of the sides thereof facint said closure members, each of said surfaces being continuous and including convex and concave surfaces separated by a point of inflection, said concave surfaces lying closer to the inner wall of said conduit than said convex surfaces, the surfaces on opposite sides of said seats converging toward one another and in a direction toward the other seat, said one closure member when moved toward the other closure member being adapted to flex the conduit and pinch the walls thereof one against the other and against said seats to close the passage through the conduit in said valve closed position, means for moving said one closure member toward said other closure member and into said valve closed position including an element mounted for reciprocating movement between first and second positions, said element being movable in a direction substantially normal to the direction of movement of said one closure member and including a cam surface with an inclined cam edge and a flat extending in a plane substantially normal to the direction of movement of said one closure member, a cam roller carried by said one closure member and engageable along said cam surface, said roller engaging said flat when said one closure member lies in said valve closed position to maintain said one closure member in said latter position, fluid actuated means for reciprocating said element between said first and second positions, and said means for moving said one closure member cooperating for moving the latter toward said other closure member and into said valve closed position in response to movement of said element from said first position to said second position.

* * * * *

UNITED STATES PATENT OFFICE
CERTIFICATE OF CORRECTION

PO-1050 (5/69)

Patent No. 3,759,483     Dated September 18, 1973

Inventor(s) Thomas D. Baxter

It is certified that error appears in the above-identified patent and that said Letters Patent are hereby corrected as shown below:

Column 3, line 50, "in a" should read --a--.

Col. 4, line 14, "And" should read --and--; line 23, "the guide" should read --guide--; line 24, "Guide" should read --guide--.

Col. 5, line 48, "generaly" should read --generally--.

Col. 6, line 14, "of failure" should read --or failure--; line 53, " -0.175 I.D. t) " should read -- 0.175 I.D. - t) --; line 61, " (1.7 " should read -- (0.7 --.

Col. 7, line 31, claim 1, "facint" should read --facing--.

Signed and sealed this 26th day of March 1974.

(SEAL)
Attest:

EDWARD M. FLETCHER, JR.
Attesting Officer

C. MARSHALL DANN
Commissioner of Patents